United States Patent [19]

Norman

[11] 4,238,111
[45] Dec. 9, 1980

[54] GATE VALVE FOR USE WITH VACUUM EQUIPMENT

[75] Inventor: Arthur E. Norman, Northridge, Calif.

[73] Assignee: Torr Vacuum Products, Inc., Van Nuys, Calif.

[21] Appl. No.: 930,886

[22] Filed: Aug. 4, 1978

[51] Int. Cl.³ .................. F16K 25/00; F16K 31/22
[52] U.S. Cl. ........................... 251/193; 251/62; 251/197; 251/204
[58] Field of Search ............ 251/196, 62, 335 B, 251/197, , 327, 167, 158, 204, 198, 193; 328/233, 235

[56] References Cited

U.S. PATENT DOCUMENTS

| 2,653,789 | 9/1953 | Eichenberg | 251/196 |
| 2,705,610 | 4/1955 | Hjulian | 251/196 |
| 2,885,172 | 5/1959 | Natho | 251/196 |
| 3,038,692 | 6/1962 | Holmes | 251/167 |
| 3,266,505 | 8/1966 | Kron | 137/312 |
| 3,368,792 | 2/1968 | Schertler | 251/158 |
| 3,397,862 | 8/1968 | Batzer et al. | 251/204 |
| 3,663,362 | 5/1972 | Stix | 313/359 |
| 3,675,072 | 7/1972 | Hohn et al. | 176/11 |
| 3,694,313 | 9/1972 | Blue et al. | 176/16 |
| 4,052,036 | 10/1977 | Schertler | 251/167 |
| 4,132,239 | 1/1979 | Bowen et al. | 137/382 |
| 4,157,169 | 6/1979 | Norman | 251/62 |

FOREIGN PATENT DOCUMENTS

704046 2/1941 Fed. Rep. of Germany ........... 251/196
264407 10/1949 Switzerland ............................ 251/196

*Primary Examiner*—Martin P. Schwadron
*Assistant Examiner*—A. Michael Chambers
*Attorney, Agent, or Firm*—Keith D. Beecher

[57] ABSTRACT

A gate valve is provided for use in conjunction with vacuum equipment in which a gate assembly is opened and closed, for example, by a pneumatic cylinder. The gate assembly is enclosed in a valve housing, and aligned openings are provided in the opposite walls of the housing. The gate assembly is moved by the pneumatic cylinder between an open and closed position with respect to the openings. The gate assembly includes a gate which is mounted on a carriage, and the carriage is moved by the pneumatic cylinder between a first position in which the gate is open, and a second position in which the gate is closed. A feature of the gate valve of the invention is that when the gate is open, a smooth bore is provided through the valve aperture with electrical surface conductivity for short-circuiting stray radio frequency electric currents.

7 Claims, 8 Drawing Figures

GATE VALVE FOR USE WITH VACUUM EQUIPMENT

RELATED APPLICATIONS

Ser. No. 841,570, filed Oct. 12, 1977 now U.S. Pat. No. 4,157,169 issued June 5, 1979, in the name of Arthur E. Norman—Fluid Operated Gate Valve For Use With Vacuum Equipment; and Ser. No. 842,110, filed Oct. 14, 1977, pending in the name of Arthur E. Norman—Gate Valve For Use With Vacuum Equipment.

BACKGROUND OF THE INVENTION

Valves for use with vacuum equipment are essentially different from valves used in conventional systems whose objective is to control the flow of a liquid or gas. In such conventional systems, some leakage of the liquid or gas can usually be tolerated. In the case of vacuum valves, however, even the slightest leak involves not merely the loss of a liquid or gas, but total destruction of the vacuum in the vacuum equipment controlled thereby. In addition, vacuum destroying gases originate not only through leaks in the valves, but also from the materials used in the construction of conventional valves. For that reason, it is most desirable to use completely sealed, all-metal valves in conjunction with vacuum equipment. Specifically, it is not feasible to use organic materials for the seals of such valves.

All-metal valves have been produced in the prior art for use with vacuum equipment, and such valves usually comprise a metal gate which is moved at right-angles to a pair of aligned openings in the valve housing which are to be opened and closed thereby. Such gate valves usually include appropriate means for causing the gate to be sealed against a seat surrounding one of the valve openings when the gate is moved to its closed position.

Copending Application Ser. No. 842,110 provides an improved construction for such a valve in which mechanical linkages and mechanisms required to actuate the gate are minimized, and in which the valve gate is actuated and forced against a seat around the opening in the valve housing by a simple mechanism which requires a minimum of moving parts. The valve housing is preferably hermetically sealed and evacuated so as to reduce the pressure differential across the gate seal to a minimum. This serves to obviate any tendency for molecular leaks to occur across the seal.

An all-metal seal is used in the valve assembly of the Copending Application Ser. No. 842,110, and the assembly is formed entirely of metal, so that it may be free from organic materials which could destroy the vacuum within the equipment controlled by the valve. Moreover, the valve assembly of the last-named copending application may operate in wide extremes of ambient temperatures without destroying the seals between its gate and the corresponding seat. Moreover, the valve assembly of the last-mentioned copending application can be placed in areas where high levels of radiation occur which would otherwise damage organic seals, and the like, and cause such seals to give off gases or vapors.

The valve assembly of the present invention represents a modification which can be incorporated into the valve assembly described in the last-named application, or in other gate valve assemblies, which enables the assembly to provide a smooth bore with an electrically conductive surface when the valve is open, which effectively short-circuits any stray radio frequency currents produced by the aforementioned radiation, which currents otherwise could create a hazard.

The requirement fulfilled by the valve of the present invention arises wherever advanced high energy physics experiments such as storage rings, linear accelerators, ion sources and similar devices are used. In such situations, isolation valves with the special feature of the valve of the present invention is required. That is, the valve, when open, must present a relatively smooth bore throughout its opening, with no large pockets being exposed through which radio frequency energy can flow, and to provide an electrical short-circuit to radio frequency energy from seat-to-seat of the valve.

The storage ring referred to above is a closed loop containing a beam which may be composed of a variety of subatomic particles, that is, protons, electrons, positrons, and the like. It is essential that the pressure inside the storage ring be very low, that is, in the ultra high vacuum range. Since the storage ring if of considerable volume, it requires vast pumping capacity and operation time to lower its internal pressure. Should a leak develop, the entire storage ring would lose vacuum. To protect against such a catastrophic loss, it is necessary to break up the ring into a series of sectors, and then to connect the sectors by means of valves, such as the valves of the present invention. The valves serve the dual purpose of providing continuity to the ring as well as selective isolation of one or more sectors which might develop leaks.

The linear accelerators referred to above have a similar use for valves such as the valves of the present invention. The difference between a linear accelerator and a storage ring is that the high energy beam, instead of traveling in a continuous circular path, is a straight beam with a source at one end and a target at the other.

When conventional valves are used, an undesirable feature from the standpoint of beam integrity arises. This is due to the difference in the dimension of the structure carrying the beam, which is essentially a tube of uniform cross-section, and the internal dimensions of the valve body. The beam depends on the internal surface of its enclosure for the maintenance of concentration and coherence. As the beam passes through the sector, an "image" current passes simultaneously along the sector wall. When the beam arrives at any given valve, the "image" current encounters an abrupt non-uniformity in its path through the valve housing when usual prior art valves are used. This disruption between the uniformity of the beam and the "image" current path causes the sharpness, coherence and intensity of the beam to be reduced, until eventually there is total disintegration of the beam. This undesirable result is obviated by the valve of the present invention which provides a continuous path for the beam through the valve.

Specifically, the prior art valve in its open position presents cavities in relation to the sector. Such cavities could support resonant modes which provide feedback and cause beam instability. It is desirable, therefore, to maintain a uniform enclosure for the beam at all points in the storage ring. The effect of the valve cavity must be reduced and this is done by means of the short-circuiting mechanism of the present invention. Without the short-circuiting mechanism, the image current would have to travel through the much longer and irregular path of the prior art valve body, thereby causing the beam to lose coherence and intensity as mentioned above.

DETAILED DESCRIPTION OF THE ILLUSTRATED EMBODIMENTS

The embodiment of the invention shown in FIGS. 1-5 comprises a gate valve assembly which includes an hermetically sealed valve housing 10 which may have a rectangular cross-section. The valve housing has two parallel side walls having aligned openings therein. A first valve seat 12 is welded into one of the openings and a second valve seat 14 is welded into the other opening.

Figure 1:
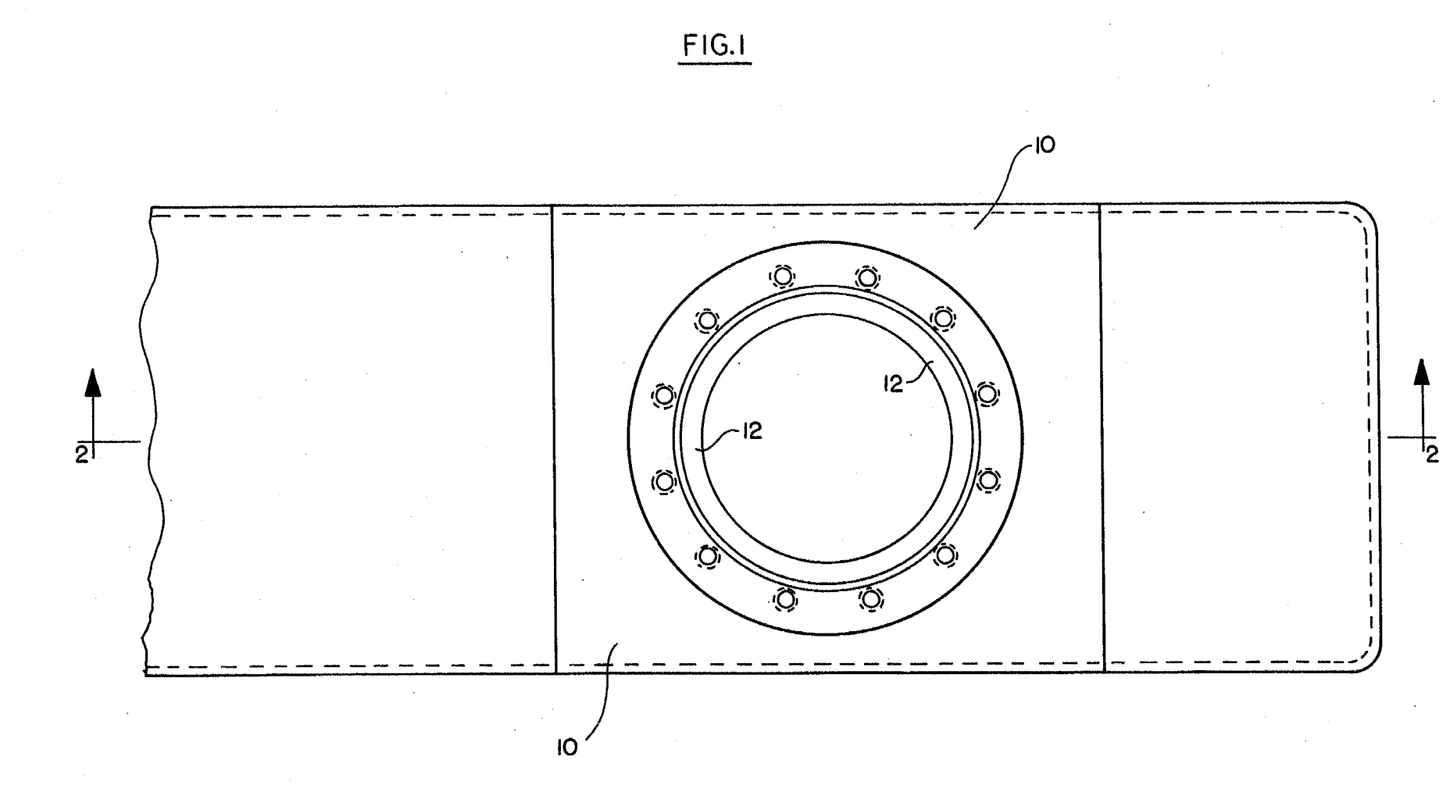
FIG. 1 is a plan view of a gate valve assembly which may be constructed to incorporate the concepts of the invention in one of its embodiments, and showing the valve assembly in an open condition.
Figure 2:
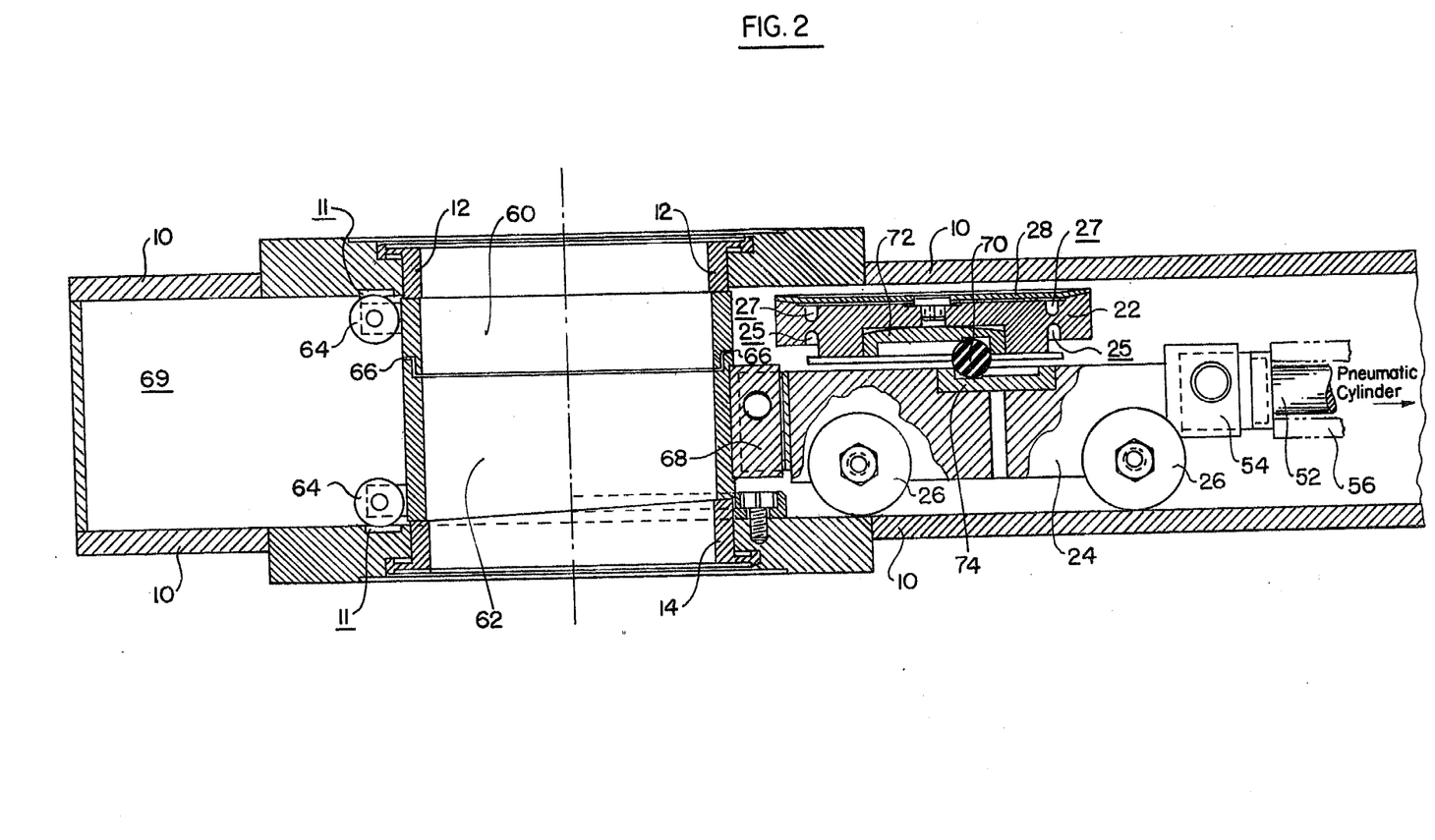
FIG. 2 is a section of the assembly of FIG. 1 taken along the line 2—2 of FIG. 1.
Figure 3:
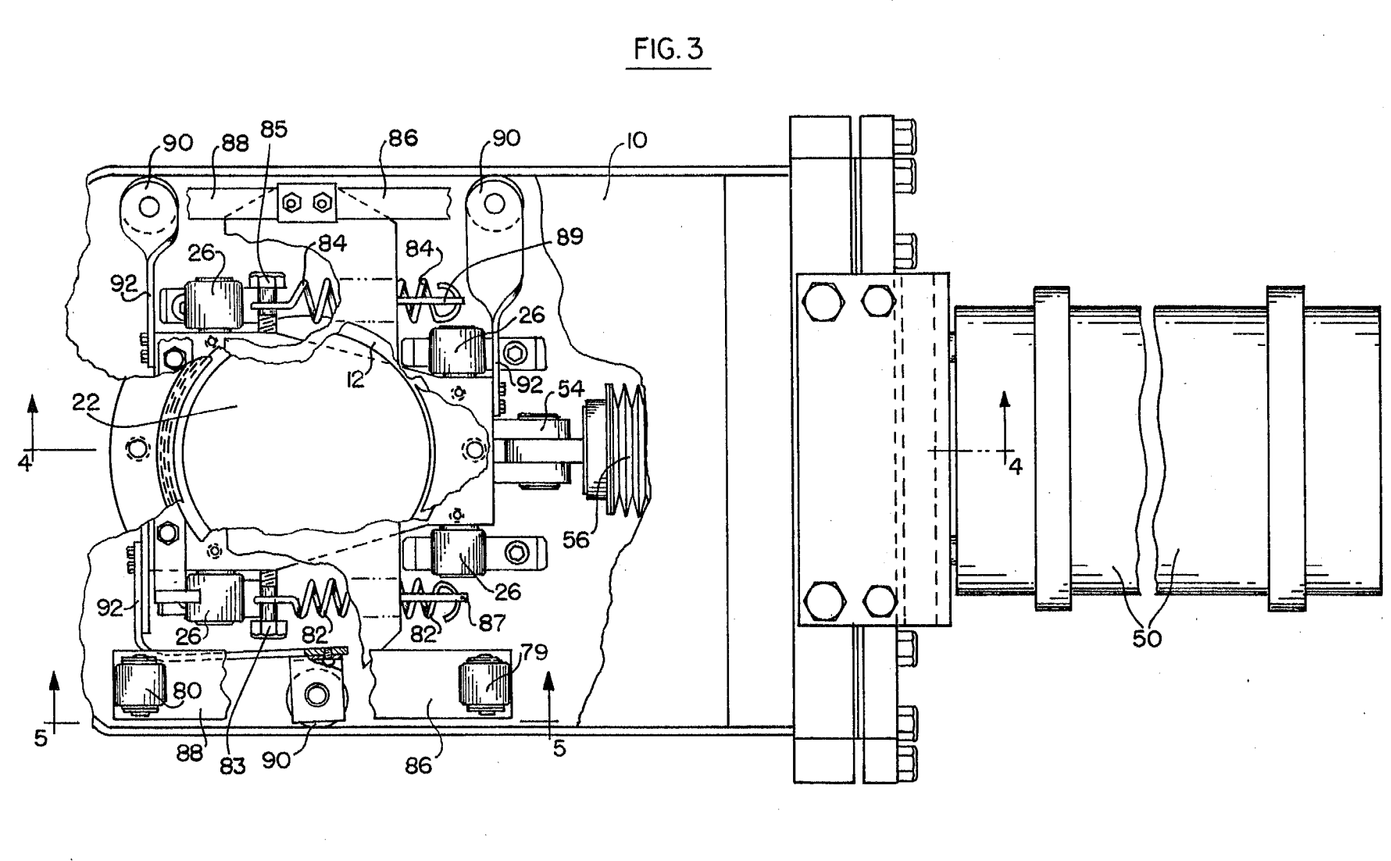
FIG. 3 is a plan view of the valve assembly of FIG. 1 in a closed condition.
Figure 4:
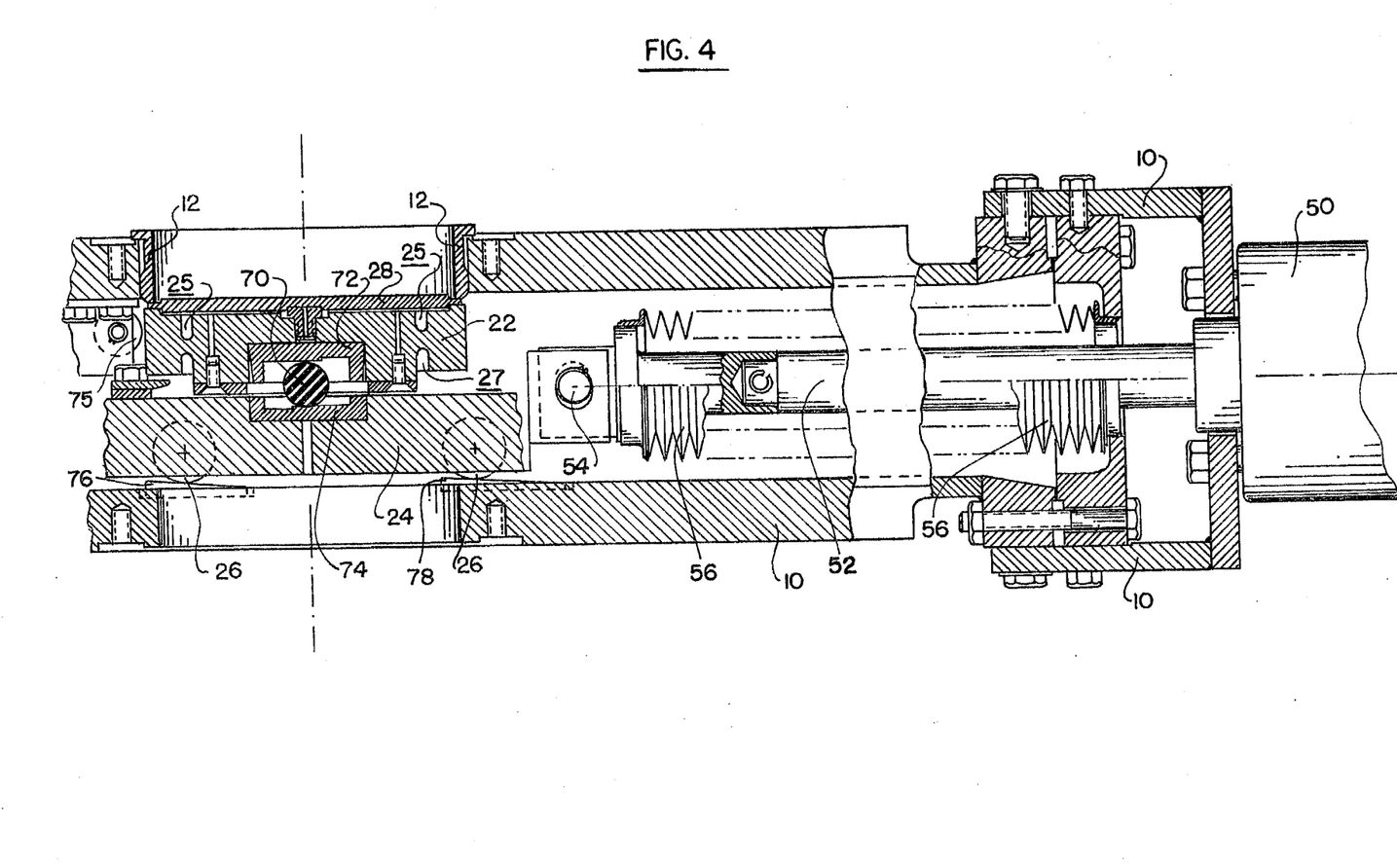
FIG. 4 is a section of the assembly of FIG. 3 taken along the line 4—4 of FIG. 3.

A gate 22 is positioned within the housing 10. The gate 22 is supported on a carriage 24 which is movable in the valve housing 10, and which rides on rollers, such as rollers 26. The carriage 24 and gate 22 are movable between an open position, such as shown in FIG. 2, and a closed position, such as shown in FIGS. 3 and 4. A seal 28 is supported on the top of gate 22. This seal may also be formed of copper, or other appropriate materials, such as silver or gold. The outer peripheral edge of gate 22 is relieved by annular slots 25, 27 so that when the gate is forced against the underside of seat 12, its peripheral edge may be resiliently deflected so that the seal may be maintained even when thermal expansion or contraction takes place.

An air cylinder, or other pneumatic actuator device 50 (FIGS. 3 and 4) is mounted on the right-hand end of valve housing 10, and a shaft 52 from the actuator extends through the valve housing 10 to be coupled to the carriage 24 by means of an appropriate yoke 54. The piston rod 52 is surrounded by a bellows 56 to provide an appropriate seal. The air cylinder 50 is operated to move the carriage 24 between the open position shown in FIG. 2, and the closed position shown in FIGS. 3 and 4. The valve housing 10, itself, is preferably evacuated, so as to reduce the pressure differential across the seal 28 between gate 22 and valve seat 12, so as to eliminate the likelihood of molecular leaks within the assembly.

As best shown in FIG. 2, a smooth bore and radio frequency continuity is provided through a two-part copper sleeve designated 60, 62. The two-part sleeve 60, 62 is attached to rollers 64 which are received in detents 11 in the housing 10 when the sleeve 60, 62 is in its illustrated position. A spring 66 is provided between the two sections of the sleeve 60, 62 which expands the two sections so that they make contact with a light force of about four pounds against the inner edges of the seats 12 and 14. The sleeve 60, 62 is coupled to carriage 24 through an appropriate coupling 68.

When the carriage 24 is moved to the left in FIG. 2 to close the valve, the rollers 64 move out of their detents 11, and force the two sections 60, 62 of the sleeve together against the bias of spring 66, so as to displace the sleeve from the seats 12 and 14. Then, the sleeve 60, 62 is moved to the left into the end section 69 of housing 10, and the gate 22 is moved into position to close the orifice through the valve.

On the other hand, when the carriage 24 is moved to the right in FIG. 2 to open the valve, it draws the sleeve 60, 62 with it, with the rollers 64 rolling along the adjacent inner surface of housing 10, until the rollers once more fall into the detents 11, at which the spring 66 again forces the ends of the sleeve into engagement with the adjacent ends of the seats 12 and 14.

The all-metal gate valve shown in FIG. 2 is capable of being baked at 200° C. in either the open or closed position and, when open, offers a smooth bore with electrical surface conductivity for short-circuiting radio frequency currents. The valve is constructed, for example of Type 304 stainless steel with certain hardened parts of 440C type stainless steel. The gate seal 28 may be constructed of OFHC copper, and the bellows 56 may be constructed of AM350 stainless steel. Only ultra-high vacuum compatible dry film lubricants are used in the valve, and the entire assembly is suitable for vacuum applications to $10^{-12}$ Torr.

The gate 22 is supported on the carriage 24 on a roller 70 which is supported between a pair of inserts 72 and 74 respectively mounted on the carriage and on the gate. When the valve is in the open position of FIG. 2, the roller engages detents in the inserts, so that the gate 22 is displaced inwardly towards the carriage 24. However, as the carriage 24 is moved to the closed position of FIGS. 3 and 4, the gate 22 engages a stop roller 75 which precisely centers the gate across the upper orifice in the valve, with the peripheral edge of seal 28 engaging the seat 12. Further movement of the carriage 24 to the left in FIG. 4 causes the carriage to move relative to the gate, since further movement of the gate is prevented by roller 75. This causes roller 70 to move out of the detents in the inserts 72 and 74, as shown in FIG. 4, which moves the gate 22 against the seat 12.

The rollers 26 also roll up ramps 76 and 78, to move the carriage and the gate against the seat 12 further to provide a compressive force against the peripheral edge of seal 28. As mentioned above, the peripheral grooves 26 provide the peripheral edge of the gate 22 with a resilient characteristic, so that the gate is firmly held against the seat 12, even in the presence of temperature variations.

Figure 5:
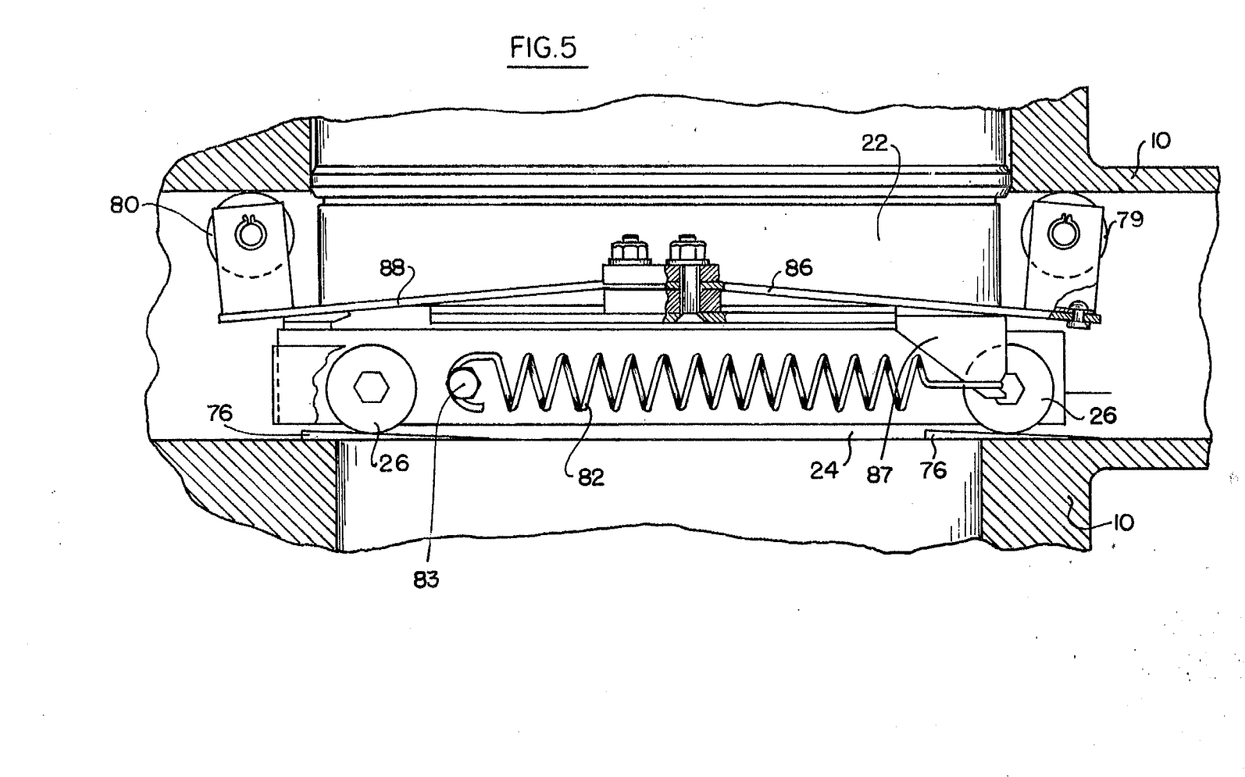
FIG. 5 is a section of the assembly of FIG. 3 taken along the line 5—5 of FIG. 3.

As best shown in FIGS. 3 and 5, further rollers, such as the rollers 79, 80 are provided on carriage 24 which engage the upper surface of housing 10. These latter rollers are spring biased into resilient engagement with the top inner surface of housing 10 by appropriate leaf springs, such as the springs 86 and 88.

The gate 22 is coupled to carriage 24 by means of a pair of springs 82 and 84 (FIGS. 3 and 4) which extend between bolts 83 and 85 on the carriage and brackets 87 and 89 on the gate. This means that the gate 22 is forced against the seat 12 only so long as the air cylinder 50 exerts a pressure against the carriage 24 to maintain the carriage in the position shown in FIG. 4. The moment that pressure is released, springs 82 and 84 pull the gate 22 back into an aligned position with the carriage 24, such as shown in FIG. 2, in which roller 70 is again received in the detents in insert 72 and 74, and the gate 22 is displaced away from the seat 12 to permit the valve to be returned to its open position of FIG. 2.

Further rollers 90 may also be attached to the carriage 24 by brackets 92, and which engage the side walls of housing 10 in FIG. 3. An appropriate opening must be formed in the sleeve 60 of FIG. 2, to permit the sleeves 60, 62 to be moved to the left in FIG. 2 without interference from the stop rollers 75 of FIG. 4.

Figure 6:
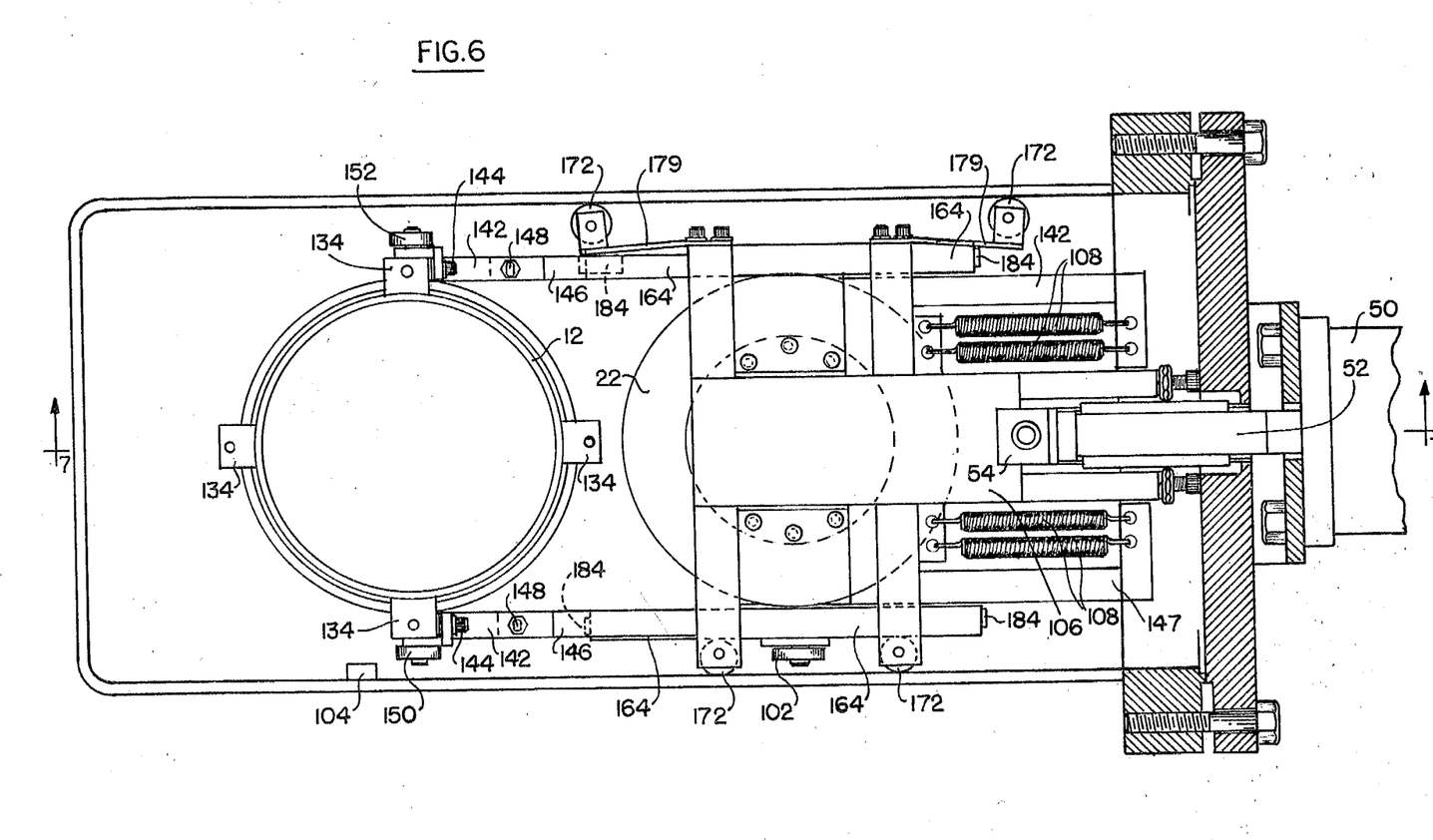
FIG. 6 is a plan view, partly in section, of a gate valve constructed in accordance with a second embodiment of the invention.
Figure 7:
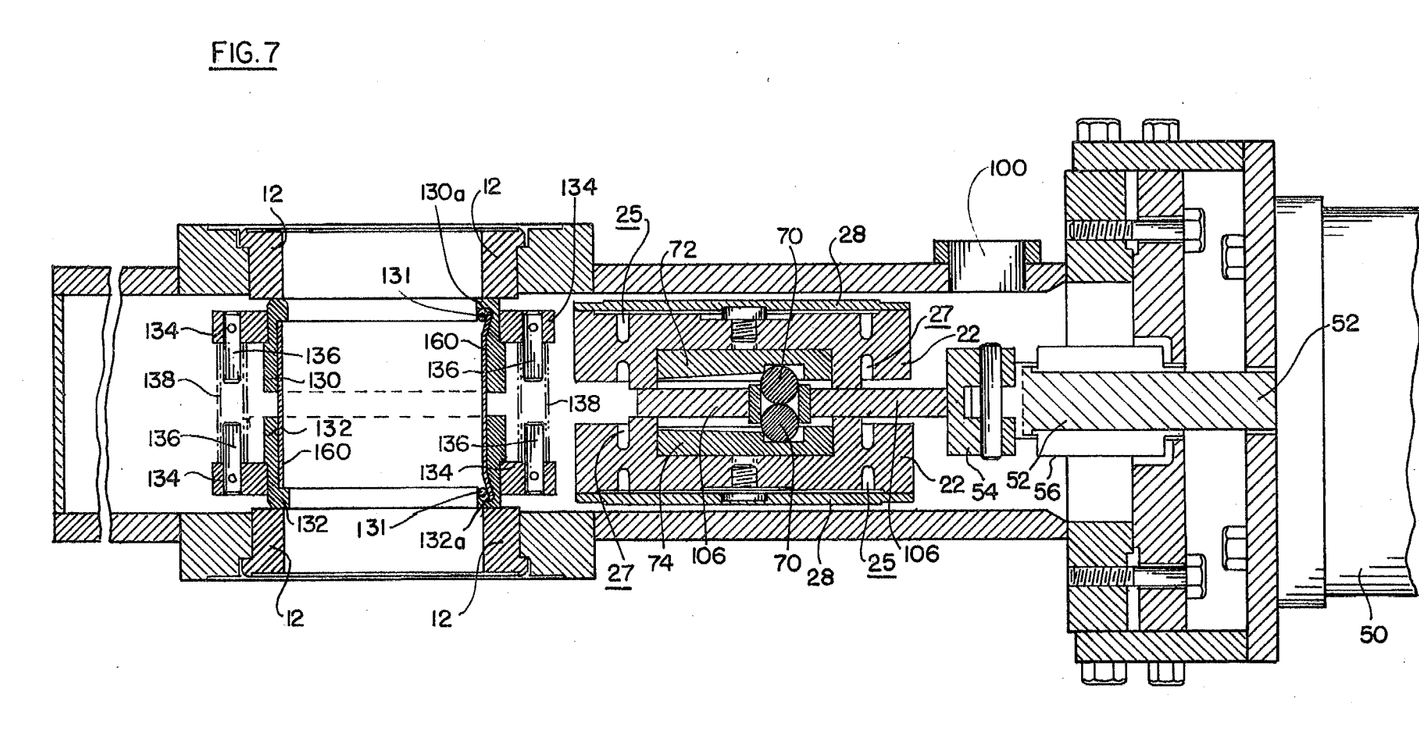
FIG. 7 is a section of the assembly of FIG. 6, taken along the line 7—7 of FIG. 6.
Figure 8:
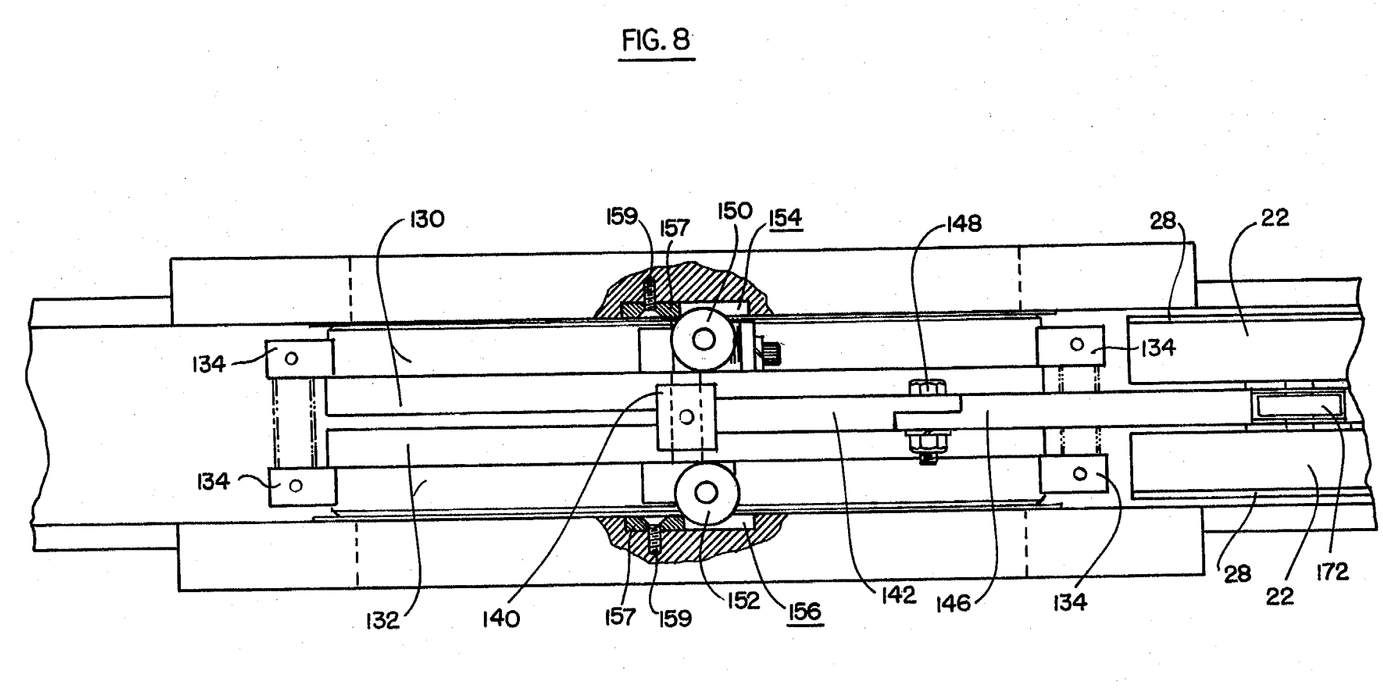
FIG. 8 is an elevation, partly in section, of a portion of the valve assembly of FIGS. 6 and 7.

A second embodiment of the gate valve assembly of the invention is shown in FIGS. 6–8, in which components similar to those of the first embodiment are identified by the same numbers. The gate valve assembly shown is in its open condition in FIGS. 6–8. In the second embodiment, as shown in FIGS. 6 and 7, the shaft 52 of the pneumatic actuator 50 is coupled to a carrier plate 106 of the gate assembly through yoke 54. The valve housing, as in the previous embodiment, is evacuated by means of an appropriate vacuum pump. The pump is coupled to the interior of the housing through a port 100 which is welded to the housing. A pair of gates 22 is supported on the carrier 106 on rollers 70, which, in turn, are trapped between inserts 72, 74.

Valve seats 12 are mounted coaxially in the valve orifice on opposite sides of the valve. When the gate carrier 106 is moved to the left in FIGS. 6 and 7 by the pneumatic actuator 50, the center line of the valve seats 12 lines up with the center line of the orifice. Moreover, when the gate assembly is moved to its closed position, rollers, such as roller 102 (FIG. 6) engage appropriate stops, such as stop 104, welded to the housing, and this engagement serves to displace the gates 22 with respect to the carrier plate 106 against the tension of extension springs 108. This action causes the rollers 70 to move out of detents in the inserts 72, 74 to press the gate seals 28 against the seats 12.

To assure that the gate seals 28 do not scrape the interior surface of the housing during movement of the gates, each gate is supported on gate supports, such as those designated 142 and 147 in FIG. 6. These gate supports carry pre-loaded leaf spring 164 and rollers 184. The rollers 102 referred to above are attached to the gate supports, and, as described, these rollers make contact with the gate roller stops, such as the stop 104, when the valve is closed by the actuator 50. When the gates 22 are so moved by the actuator to their position in which their center line is aligned with the center line of the orifice of the valve, the gates are then in position for commencing the secondary motion, by which the gates are moved against the seats 12 to provide the necessary sealing of the valve.

The foregoing is achieved, as described above, by the carrier plate 106 forcing the rollers 70 out of detents in the inserts 72 and 74, and thereby forcing the seals 28 of gates 20 against the seats 12 thereby effectuating a dual seal for the valve orifices. The configuration of inserts 72 and 74 provides a high mechanical advantage so that the thrust of the pneumatic actuator 50 results in an interface load between the gates 20 and the seats 12 sufficient to create high vacuum seals. The pump port 100, as described, permits evacuation of the interior of the housing so as to reduce the effect of small leaks which might occur at either seal due to system impurities introduced during normal functioning of the valve.

When the valve is opened, the pneumatic actuator 50 causes the carrier 106 and captured rollers 70 to withdraw the gates 20 from the seats 12. The gate springs 164 cause the gates 22 to retract away from the faces of seats 12 until an adequate clearance between the gates and the interior surface of the housing is provided for the return stroke of the actuator to the full open position of the valve shown in FIGS. 6 and 7. Depending upon the orientation of the valve assembly it is possible for the weight of the gates to interfere with their retraction from the faces of seats 12. The pre-loaded extension springs 108 are provided to exert adequate force on the gates thereby to assure positive retraction thereof when required.

Side springs 179 are also mounted on the carrier plate 106, and these side springs provide a pre-loaded condition to assure that four roller bearings 172, carried by the carrier plate are maintained in continuous contact with the inner surface of the housing, and also to preclude side loading of the piston of the pneumatic actuator 50.

As in the previous embodiment, when the valve of FIGS. 6–8 is open, a passage is provided, not only for fluid flow, but also for high energy radio frequency waves. In order to provide a conductive path for such waves, without producing detrimental energy loss, it is essential for the passageway through the valve to have a smooth bore configuration and to be electrically conductive.

The foregoing is achieved in the embodiment of FIGS. 6–8 by a radio frequency sub-assembly which is attached to the carrier plate 106, and which is moved into coaxial relationship with the valve orifice when the valve is opened, and which is displaced from the orifice when the valve is opened.

The radio frequency sub-assembly in the valve of FIGS. 6–8 comprises two identical open-ended cylindrical sections 130, 132. Each of the cylinders has four ears 134 welded to it, and positioned on its outer periphery at angular positions displaced 90° from one another. One pair of diametrically opposite ears on each cylinder carries coaxial shafts 136 (FIG. 7) which act as guides for helical compression springs 138 coaxially mounted around the shafts. The other pair of diametrically opposite ears of each cylinder carries a shaft 140 (FIG. 8) which maintains the two cylinders in coaxial relationship as they move axially towards and away from one another, against and from the force of the compression springs 138.

Two arms 142 are respectively attached to the shafts 140, and these arms are coupled to arms 146 on the carrier plate 106 by bolts 148. The holes in the arms 142 and 146 which receive the bolts 148 are transversely slotted, as shown in FIG. 6 to permit accurate positioning of the radio frequency sub-assembly with respect to the center line of the pneumatic actuator 50.

The radio frequency sub-assembly carries rollers 150 and 152 which roll along the inner surfaces of the housing when the sub-assembly is moved by the carrier plate 106 from its position coaxial with the valve orifices when the valve is open, to its position displaced to the left of the orifices in FIGS. 7 and 8 when the valve is closed. When the valve is open, and the radio frequency sub-assembly is in its coaxial position with respect to the orifices, the rollers 150, 152 are received in detents 154, 156 (FIG. 8) to permit the springs 138 to bias the cylinders 130, 132 away from one another and against the valve seats 12. When the sub-assembly is moved to its displaced position, on the other hand, the rollers 150, 152 move out of the detents 154, 156 and cause the cylinders to move towards one another against the bias of springs 138 so as to be displaced inwardly away from the seats and away from the inner surface of the housing.

Inserts 157 are mounted in the detents 154 and 156, and are held in place by screws 159, as shown in FIG. 8. The rollers 150 and 152 make positive contact with the edges of the inserts, and do not touch the bottoms of the detents. Rather, the rollers drop below the inner edges of the inserts, but are displaced from the bottoms of the detents so that the edges of the cylinders 130, 132 will be positively biased against the valve seats 12 by the springs 138 of FIG. 7. The contacting edges of the cylinders are lapped and silver plated to assure uniform contact with the seats 12 around the circumference of each cylinder for optimum electrical conductivity.

When the pneumatic actuator 50 is operated to close the valve of FIGS. 6-8, the rollers 150, 152 react instantaneously against the edges of the segments 157, and this causes an instantaneous separation of the edges of the cylinders 130, 132 and the valve seats 12 to obviate any tendency for the edges of the cylinders to damage the surfaces of the valve seats. Adequate clearance between the radio frequency sub-assembly and the valve seats, and between the sub-assembly and the inner surface of the housing, permits displacement of the sub-assembly to the left of FIGS. 7 and 8 until the closure stroke of the pneumatic actuator is completed, and the valve is closed to provide a high vacuum seal, as described above.

A radio frequency strip 160 (FIG. 7) bent into an open-ended cylindrical configuration is retained in circumferential grooves, 130a, 132a machined around the bore surface of each of the cylindrical sections 130, 132. This strip provides a smooth, electrically conductive surface between the two cylinders 130, 132. The strip may include a series of slots (not shown) to increase its flexibility. The strip 160 is cut to have a width slightly greater than the distance between the circumferential grooves, so as to cause the strip to bow slightly inwardly when it is in place. Such a construction causes the edges of the strip to exert an appreciable force against the sides of the circumferential grooves in the cylinders so as to assure positive electrical contact therewith. In FIG. 7, strip 160 is shown with its end supported in an annular channel in the bore of the cylinder 130 by a wire 131. The other end may be similarly supported by a similar wire 131.

An important feature of the radio frequency sub-assembly is the provision of a 45° chamfer at the outer edge of each of the cylinders 130, 132, as shown in FIGS. 7 and 8. This chamfer assures minimum radial width of the zero of contact between the cylinders and the valve seats. The outer annular portion of each of the valve seats is therefore not contacted by the radio frequency sub-assembly, and is not subject to damage. The gate seats are dimensioned so as to utilize the undamaged outer annular portions thereof to seal with the gates 22 when the valve is closed.

The invention provides, therefore, a geate valve for particular use in conjunction with vacuum equipment, and which may be opened and closed by an appropriate operator, such as a pneumatic actuator. As described, the gate valve includes a radio frequency sub-assembly which moves with the gate assembly within the valve, so that when the gate assembly is moved to open the valve, the radio frequency sub-assembly is drawn into coaxial relation with the valve seats, and is resiliently biased against the seats, so as to provide a smooth bore through the valve aperture for the free passage of radio frequency electrical currents, so as to prevent hazards which would otherwise occur due to such currents.

While the radio frequency sub-assembly is shown and described in conjunction with a particular type of gate valve, it is obvious that the sleeve could be used with other types of gate valves and still perform its intended function.

Therefore, while particular embodiments of the invention have been shown and described, modifications may be made. It is intended in the claims to cover all modifications which come within the spirit and scope of the invention.

What is claimed is:

1. A gate valve for use in conjunction with vacuum equipment, and the like, comprising: a housing having a pair of opposite walls with aligned orifices therein; a pair of annular valve seats mounted to surround respective ones of said orifices; a gate assembly mounted in said housing, said gate assembly including a carrier, and at least one gate mounted on the carrier; an actuator coupled to the carrier for reciprocally moving the gate assembly in a direction parallel to the opposite walls of the housing between a first position coaxial with said orifices and a second position displaced from said orifices; a sub-assembly including two open-ended electrically conductive cylindrical sections coaxially adjacent to one another and coupled to the carrier and movable to a position coaxial with said seats when the gate assembly is moved to the second position, resilient means mechanically coupled to the two cylindrical sections for biasing the two sections into respective engagement with corresponding ones of the valve seats when the gate assembly is moved to the second position, said sub-assembly including means interconnecting said section to provide a smooth electrically conductive bore surface between the orifices and said cylindrical sections for the free passage of radio frequency currents when the valve is open; and roller means coupled to the sub-assembly and engaging the inner surface of the housing as the gate assembly is moved by the carrier toward said second position to allow said sections to move toward one another away from said seats, the roller means being received in detents in the inner surface of the housing to permit the resilient means to bias the cylindrical sections into respective engagement with the valve seats when the sub-assembly is axially aligned with the orifices when said gate assembly is moved toward said first position.

2. The gate valve defined in claim 1, and which said smooth bore surface means includes a sleeve coaxially contained within the cylindrical sections.

3. The gate valve defined in claim 2, in which the ends of the sleeve are received in annular channels in the bores of the respective cylindrical sections, the length of the sleeve being greater than the distance between the channels to cause the sleeve to bow and thereby exert a positive force against the sides of the channels.

4. The gate valve defined in claim 3, and which includes annular-shaped wires for retaining the ends of the sleeve in the channels.

5. The gate valve defined in claim 1, in which each of said sections has ears thereon at selected angular positions around the periphery thereof, and shafts mounted coaxially in said ears, and in which said resilient means comprises helical springs coaxially mounted around the shafts.

6. The gate valve defined in claim 1, in which the outer edges of the cylindrical sections which engage the valve seats are chamfered to minimize the angular area of contact of the valve seats by the cylindrical sections.

7. The gate valve defined in claim 1, in which the detents are configured to receive the roller means at one edge thereof with the roller means being displaced up from the bottoms of the detents so as to assure positive biasing pressure by said resilient means of the cylindrical sections against the valve seats.

* * * * *